US012759929B2

(12) United States Patent
Bajaj et al.

(10) Patent No.: US 12,759,929 B2
(45) Date of Patent: Oct. 13, 2026

(54) ELECTROLESS PLATING

(71) Applicant: Yield Engineering Systems Inc., Fremont, CA (US)

(72) Inventors: Rajeev Bajaj, Fremont, CA (US); Christopher Lane, Los Gatos, CA (US); Deepak Pandey, San Jose, CA (US); Purnima Narayanan, Fremont, CA (US)

(73) Assignee: Yield Engineering Systems, Inc., Fremont, CA (US)

( * ) Notice: Subject to any disclaimer, the term of this patent is extended or adjusted under 35 U.S.C. 154(b) by 0 days.

(21) Appl. No.: 19/420,207

(22) Filed: Dec. 15, 2025

(65) Prior Publication Data

US 2026/0285743 A1 Sep. 24, 2026

Related U.S. Application Data

(62) Division of application No. 19/084,187, filed on Mar. 19, 2025.

(51) Int. Cl.
*C03C 17/10* (2006.01)
*C03C 17/00* (2006.01)

(52) U.S. Cl.
CPC ............ *C03C 17/10* (2013.01); *C03C 17/002* (2013.01); *C03C 2218/111* (2013.01); *C03C 2218/30* (2013.01)

(58) Field of Classification Search
None
See application file for complete search history.

(56) References Cited

U.S. PATENT DOCUMENTS

| | | | |
|---|---|---|---|
| 5,077,099 A | 12/1991 | Kukanskis et al. | |
| 5,484,626 A * | 1/1996 | Storjohann | C23C 18/1683 427/10 |
| 11,642,690 B1 | 5/2023 | Kempf | |
| 2004/0022957 A1* | 2/2004 | Thompson | C23C 18/31 427/304 |
| 2013/0034959 A1 | 2/2013 | Chen et al. | |
| 2018/0298486 A1 | 10/2018 | Alves | |

FOREIGN PATENT DOCUMENTS

| | | |
|---|---|---|
| CN | 1900358 A | 1/2007 |
| CN | 1981070 A | 6/2007 |
| JP | H04-103772 A | 4/1992 |
| WO | WO 2024/040295 A1 | 2/2024 |

OTHER PUBLICATIONS

Gamry Instruments, found at https://www.gamry.com/application-notes/qcm/basics-of-a-quartz-crystal-microbalance/.*
Marxer et al., Anal Bioanal Chem (2003) 377: 570-577.*
International Search Report and Written Opinion in International Application No. PCT/US2025/025339, mailed on Jun. 25, 2025, 7 pages.

* cited by examiner

*Primary Examiner* — James M Mellott
(74) *Attorney, Agent, or Firm* — Fish & Richardson P.C.

(57) ABSTRACT

An apparatus comprising: a tank configured to hold an electroless plating solution and a substrate on which electroless plating is to be performed, the substrate immersed in the electroless plating solution; one or more transducers arranged to transmit vibrations to the substrate; and a driver configured to provide a drive signal to the one or more transducers, wherein the drive signal is configured to cause the one or more transducers to vibrate the substrate at a resonance frequency of the substrate.

19 Claims, 8 Drawing Sheets

ELECTROLESS PLATING

CLAIM OF PRIORITY

This application is a divisional of and claims priority to U.S. patent application Ser. No. 19/084,187, filed on Mar. 19, 2025, the entire contents of which are hereby incorporated by reference.

TECHNICAL FIELD

The present disclosure generally relates to material processing systems, e.g., for electroless plating.

BACKGROUND

Electroless plating, sometimes referred to as electroless deposition, is a process by which materials, such as metals and metal alloys, can be deposited onto surfaces. Electroless plating processes may use a redox reaction to autocatalytically reduce metal cations into elemental metals at the deposition surface. Electroless plating can be performed on both conductive and nonconductive surfaces, including plastics, oxides, and the like.

SUMMARY

Some aspects of the present disclosure describe an apparatus including: a tank configured to hold an electroless plating solution and a substrate on which electroless plating is to be performed, the substrate immersed in the electroless plating solution; one or more transducers arranged to transmit vibrations to the substrate; and a driver configured to provide a drive signal to the one or more transducers, wherein the drive signal is configured to cause the one or more transducers to vibrate the substrate at a resonance frequency of the substrate.

This and other apparatuses described herein can have one or more of at least the following characteristics.

In some implementations, the one or more transducers are mounted to one or more walls of the tank.

In some implementations, the one or more transducers are arranged to be immersed in the electroless plating solution.

In some implementations, the apparatus includes a sensor configured to detect vibrations of at least one of the substrate or the electroless plating solution. The driver is configured to: receive an output from the sensor indicating detection of vibrations of the substrate; and, in response to receiving the output from the sensor, generate the drive signal.

In some implementations, the sensor includes: a motion sensor configured to detect motion of the electroless plating solution, a pressure sensor configured to detect a pressure of the electroless plating solution, an optical sensor configured to detect motion of the substrate, or a motion sensor configured to detect motion of the substrate.

In some implementations, the driver is configured to provide a plurality of test drive signals to the one or more transducers. The plurality of test drive signals are configured to cause the one or more transducers to vibrate the substrate at different respective frequencies. The driver is configured to: receive, for each of the plurality of test drive signals, a corresponding output from the sensor, the corresponding output indicative of a magnitude of vibrations of the substrate caused by the test drive signal; and, in response to receiving the corresponding outputs from the sensor, generate the drive signal. A frequency of the drive signal is based on the magnitudes of vibration caused by the plurality of test drive signals.

In some implementations, the drive signal has a frequency less than 1 kHz.

In some implementations, the frequency of the drive signal is in a range from 200 Hz to 500 Hz.

In some implementations, the resonance frequency is within 30 Hz of a maximum resonance frequency of the immersed substrate.

In some implementations, the resonance frequency is in a range of frequencies bounded by half-maximum points at which a magnitude of vibration of the substrate is half of a magnitude of vibration at a maximum resonance frequency of the immersed substrate.

In some implementations, the one or more transducers include a first transducer and a second transducer, and the first transducer and the second transducer are arranged on opposing walls of the tank.

In some implementations, the apparatus includes a rack configured to hold the substrate in the tank. The rack is configured to hold, as the substrate, a glass panel.

In some implementations, the one or more transducers include at least one of: a piezoelectric transducer, or an electrodynamic transducer that includes a diaphragm.

Some aspects of this disclosure describe a method that includes: immersing a substrate in an electroless plating solution in a tank; vibrating the substrate at a resonance frequency of the substrate; and, during vibration of the substrate, depositing a material on the substrate using the electroless plating solution.

This and other methods described herein can have one or more of at least the following characteristics.

In some implementations, vibrating the substrate at the resonance frequency includes vibrating one or more transducers that are arranged to transmit vibrations to the substrate.

In some implementations, the one or more transducers include at least one of: one or more transducers mounted to one or more walls of the tank, or one or more transducers immersed in the electroless plating solution.

In some implementations, vibrating the substrate includes transmitting vibrations to the substrate through the electroless plating solution.

In some implementations, the method includes: measuring a magnitude of vibrations of at least one of the substrate or the electroless plating solution; and determining a resonance frequency of vibration of the substrate based on the measured magnitude of the vibrations.

In some implementations, measuring the magnitude of the vibrations includes at least one of: measuring motion of the electroless plating solution, measuring a pressure of the electroless plating solution, or measuring motion of the substrate.

In some implementations, the resonance frequency is less than 1 kHz.

In some implementations, the resonance frequency is within 30 Hz of a maximum resonance frequency of the immersed substrate.

In some implementations, the substrate includes a glass panel.

In some implementations, the method includes: vibrating the substrate at a plurality of different frequencies; for each of the plurality of different frequencies, measuring a corresponding magnitude of vibration of at least one of the substrate or the electroless plating solution; and determining the resonance frequency based on the measured corresponding magnitudes of vibration.

DETAILED DESCRIPTION

Glass substrates, such as glass panels, are of increasing interest as an alternative to semiconductor and organic substrates, e.g., silicon wafers. Compared to traditional substrates, glass substrates can provide lower dielectric constant, thermal stability, and ultra-low flatness, among other potential advantages.

Because glass substrates are insulators, electroless plating, which can be performed on both conductive and nonconductive substrates, is an attractive option for metallization on glass substrates. For example, electroless plating can be performed to deposit metal vias extending through glass substrates. To perform electroless plating, a substrate is immersed in a suitable electroless plating solution, and metals or metal-containing compounds from the solution autocatalytically deposit on the substrate. Electroless plating is also useful for deposition on a variety of other substrates, including silicon and silicon-on-insulator (SOI) substrates, organic substrates, sapphire substrates, and substrates composed of other materials.

Hydrogen gas is a typical reaction product of electroless plating. Small hydrogen bubbles (for example, micron-sized or sub-micron-sized bubbles) can adhere to the reaction surface. If these bubbles are not removed, they may become trapped in the electroless-deposited film, resulting in blisters, hydrogenated films, among other undesired outcomes.

Mechanical agitation may be useful for removing hydrogen bubbles from the reaction surface and providing improved film quality and continuity. Substrates may be agitated using a "shock" approach in which substrates or substrate holders are quickly lifted and dropped onto hard surfaces, or otherwise shaken with high acceleration/force, to create out-of-plane vibrations, loosening hydrogen bubbles. However, this and other existing approaches to bubble removal may be incompatible with the use of glass substrates, which are prone to breakage in response to mechanical shocks.

Some implementations according to this disclosure provide a vibration-based approach to bubble removal during electroless deposition. Compared to existing approaches, vibrations may be less likely to cause damage to substrates and/or may be more effective at removing bubbles, thereby providing higher-quality electroless-plated films, e.g., more complete via-filling.

Figure 1:
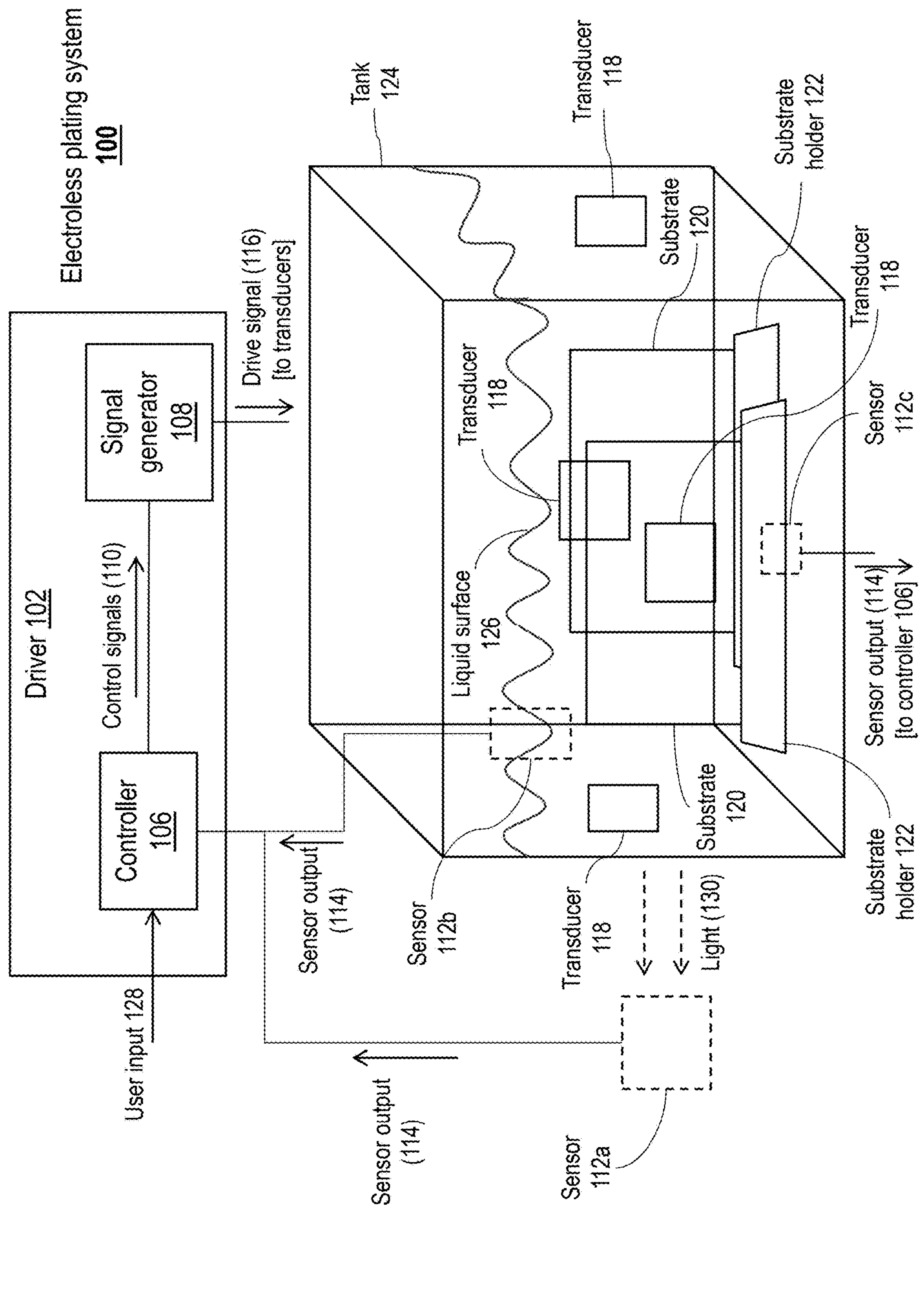
FIG. 1 is a diagram illustrating an example of an electroless plating system.

FIG. 1 illustrates an example of an electroless plating system 100. The system 100 includes a tank 124 (sometimes referred to as a cell) in which electroless plating is performed on one or more substrates 120. The tank 124 can be composed of, for example, stainless steel, plastic, and/or another suitable material. The substrates 120 can be held by one or more substrate holders 122, e.g., one or more racks having slots in which the substrates 120 can be positioned to maintain the substrates 120 in place. Additionally or alternatively, the substrate holders 122 can include clamps, clips, vacuum-based holders, and/or the like.

In some implementations, the substrates 120 are oriented vertically as shown in FIG. 1, with their planar or generally-planar surfaces facing laterally and extending vertically with respect to a direction of gravity. In some implementations, this orientation provides improved bubble removal, because bubbles from the planar or generally-planar surfaces, or vias extending from the surfaces, may require little or no lateral travel distance to then freely travel upward, away from the substrates 120. In some implementations, in addition to being oriented vertically, the substrates 120 are spaced laterally apart from one another, as shown in FIG. 1. This arrangement can provide improved bubble removal, because bubbles from a substrate 120 can travel upward and away from the substrate 120 without encountering another substrate 120. However, other arrangements and orientations are also within the scope of this disclosure. For example, in some implementations, the substrates 120 are oriented horizontally and/or are stacked vertically spaced-apart from one another. As another example, although FIG. 1 shows the substrate holders 122 at a bottom or base of the tank 124, the substrate holders 122 can instead or additionally be arranged at sides and/or at a top of the tank 124, e.g., holding the substrates 120 from above. Further, as noted above, although the substrates 120 are illustrated in plurality, in some implementations only a single substrate 120 is present.

The tank 124 is configured to hold an electroless plating solution, which is indicated in FIG. 1 by a liquid surface 126. The solution may fill the tank 124 only partially as shown in FIG. 1, or may fill an entirety of the tank 124. The tank 124, substrates 120, and/or substrate holders 122 can be arranged and/or configured such that the substrates 120 are partially or entirely immersed in the solution during electroless plating, e.g., are partially or entirely submerged beneath the liquid surface 126.

The substrates 120 can include, but are not limited to, glass panels, semiconductor substrates (e.g., silicon wafers or GaAs wafers), silicon-on-insulator (SOI) substrates, dielectric substrates (e.g., sapphire substrates), and/or printed circuit boards. The processes described herein are applicable to a variety of substrate sizes, including large-area substrates such as glass panels with lateral dimensions of about 50 cm by 50 cm. Other sizes of substrates, including other sizes of glass substrates, are also within the scope of this disclosure. For example, the substrates 120 can include silicon wafers with a diameter in a range from 100 mm to 675 mm (e.g., 100 mm, 150 mm, 200 mm, 300 mm, 450 mm, or 675 mm), or another diameter. As further examples, the glass substrates can include, for example, panels with length and/or width in a range from 100 mm to 1 m or more.

Any suitable electroless plating solution can be used for electroless plating as described herein, in accordance with the choice of substrate and desired material(s) to deposit. For example, in some implementations, the electroless plating solution is configured to deposit nickel, copper, palladium, or gold, or an alloy thereof. In some implementations, the electroless plating solution includes a salt of a metal to be deposited, a reducing agent, and one or more optional additives. For example, to deposit copper, the electroless plating solution can include copper sulfate, a reducing agent such as formaldehyde, a complexing agent such as tartrate, a pH adjuster such as sodium hydroxide, and one or more stabilizers. It will be understood that the composition of the electroless plating solution is not limited herein and that any composition suitable for deposition of the selected material(s) on the substrates 120 is within the scope of this disclosure. The deposited material(s) can include, for example, one or more of the metals listed above, and/or metal alloy(s) such as nickel-phosphorous (Ni—P) and/or nickel-boron (Ni—B).

Referring again to FIG. 1, the system 100 includes components that are configured to vibrate the substrates 120 to promote removal of bubbles from surfaces of the substrates 120. In some implementations, the system 100 includes one or more transducers 118 driven by a driver 102. The driver 102 includes a controller 106 that controls operations of the driver 102, e.g., that receives sensor output 114 and/or user input 128 and, based on the sensor output 114 and/or user input 128, controls a frequency, amplitude, and/or shape of drive signals 116 output by the driver 102 and provided to the transducers 118. The driver 102 further includes a signal generator 108 configured to generate the drive signals 116 based on control by the controller 106. The controller 106 and the signal generator 108 can be integrated into a common single device (e.g., sharing an enclosure and/or display), and/or can be at least partially separate. For example, in some implementations, the controller 106 is a user device (e.g., a desktop or laptop computer, or a mobile device such as a smartphone) separate from the signal generator 108. The driver 102 can be a system include two or more devices implementing the controller 106 and the signal generator 108.

In some implementations, the drive signals 116 are provided to the transducers 118 through wired connection(s). In some implementations, the drive signals 116 are provided to the transducers 118 wirelessly. In some implementations, the transducers 118 are configured to receive power inputs (distinct from the drive signals 116) to power their vibrations. The power can be provided from external sources using wired powerlines (which can be the same as the wired connections for the drive signals 116 in some implementations), or wirelessly through electro-magnetic charging. Additionally or alternatively, the transducers 118 can be powered using in-built energy sources (e.g., batteries or solar charging). In some implementations, the drive signals 116 provide power for vibration, e.g., so that a separate power input may not be included. Further details on the signal generator 108 are provided below with respect to FIG. 4.

The transducers 118 are configured to vibrate in response to the drive signals 116, such that their vibrations are transmitted to the substrates 120 and cause the substrates 120 to vibrate, as described below. For example, drive signals 116 with a frequency f can cause the transducers 118 to vibrate with a frequency for approximately f. Various types of transducer 118 are within the scope of this disclosure. In some implementations, the transducers 118 are piezoelectric transducers including a piezoelectric material that vibrates responsive to the drive signals 116. For example, the transducers 118 can have a "piezoelectric sandwich" structure in which a piezoelectric material is sandwiched between two films or layers. In some implementations, the transducers 118 are electrodynamic transducers that include diaphragms configured to move responsive to magnetic fields generated by the drive signals 116, e.g., as in a loudspeaker or headphone. In implementations in which the transducers 118 are at least partially immersed in the electroless plating solution, the transducers 118 can be composed of materials resistant to the electroless plating solution. In some implementations, a vibrating element of the transducers 118 is in contact with the electroless plating solution so as to transmit vibrations to the electroless plating solution. In some implementations, the transducers 118 have lateral dimensions similar to those of the substrates 120. For example, a lateral dimension of the transducers 118 can be at least 80% of or at least 100% of a lateral dimension of the substrates 120, e.g., at least 50 cm.

For purposes of this disclosure, it has been recognized that some types of transducers 118 may be particularly suitable for operation as described herein For example, the transducers 118 may be configured for operations at powers of at least 150 Watts or at least 200 Watts in continuous-wave mode and/or at frequencies in a range from 150 Hz to 10 kHz. In some implementations, the transducers 118 include sub-bottom profiling transducers suitable for emitting sound pulses towards the seafloor. For example, the Massa TR-1075 system, made by Massa Products Corporation, has been found to be suitable as a transducer 118. The Massa TR-1075 is capable of operating in the range of 2.5-10 KHz with 200 Watts power in continuous wave mode.

The one or more transducers 118 can be arranged in one or more locations such that vibration of the transducers 118 is transmitted to the substrates 120, to cause corresponding vibration of the substrates 120. In some implementations, the transducers 118 are at least partially immersed in the electroless plating solution. For example, the transducers 118 can be suspended in the tank 124 in the electroless plating solution and/or can be mounted to inner wall(s) of the tank 124, e.g., lateral wall(s) and/or a bottom inner wall of the tank 124. For example, in some implementations, as shown in FIG. 1, respective transducers 118 are arranged on four inner lateral walls of the tank 124. The transducers' 118 vibrations can be transmitted from the transducers 118 to the electroless plating solution and, from the electroless plating solution, to the substrates 120. For example, vibration of the substrates 120 can be based primarily on vibrations transmitted from the electroless plating solution to the substrates 120. In some implementations, vibrating the substrates 120 through the electroless plating solution advantageously provides relatively spatially-uniform distribution of vibrations to the substrates 120, which can result in effective bubble removal (e.g., removing bubbles from throughout the surface of the substrates 120).

In some implementations, the transducers 118 are exterior to the electroless plating solution, e.g., mounted to an outer wall of the tank 124. In some implementations, the transducers 118 are attached or otherwise mechanically coupled to the substrate holders 122 so as to vibrate the substrates 120 at least partially through the substrate holders 122. In some implementations, the transducers 118 are attached or otherwise mechanically coupled to the substrates 120, e.g., so as to vibrate the substrates 120 at least partially without coupling through the electroless plating solution or the substrate holders 122. The foregoing and other arrangements of the transducers 118 that permit the transducers 118 to vibrate the substrates 120 can be the same for all transducers 118, or the transducers 118 can be arranged differently from one another, e.g., using a combination of the above arrangements.

The substrates 120 can be vibrated at a frequency that promotes bubble removal. For example, in some implementations, the substrates 120 are vibrated at a resonance frequency of the substrates 120. When the substrates 120 are vibrated at a resonance frequency, they will naturally exhibit a larger physical response (magnitude of vibration/movement), corresponding to increased movement and increased bubble removal.

Figure 2:
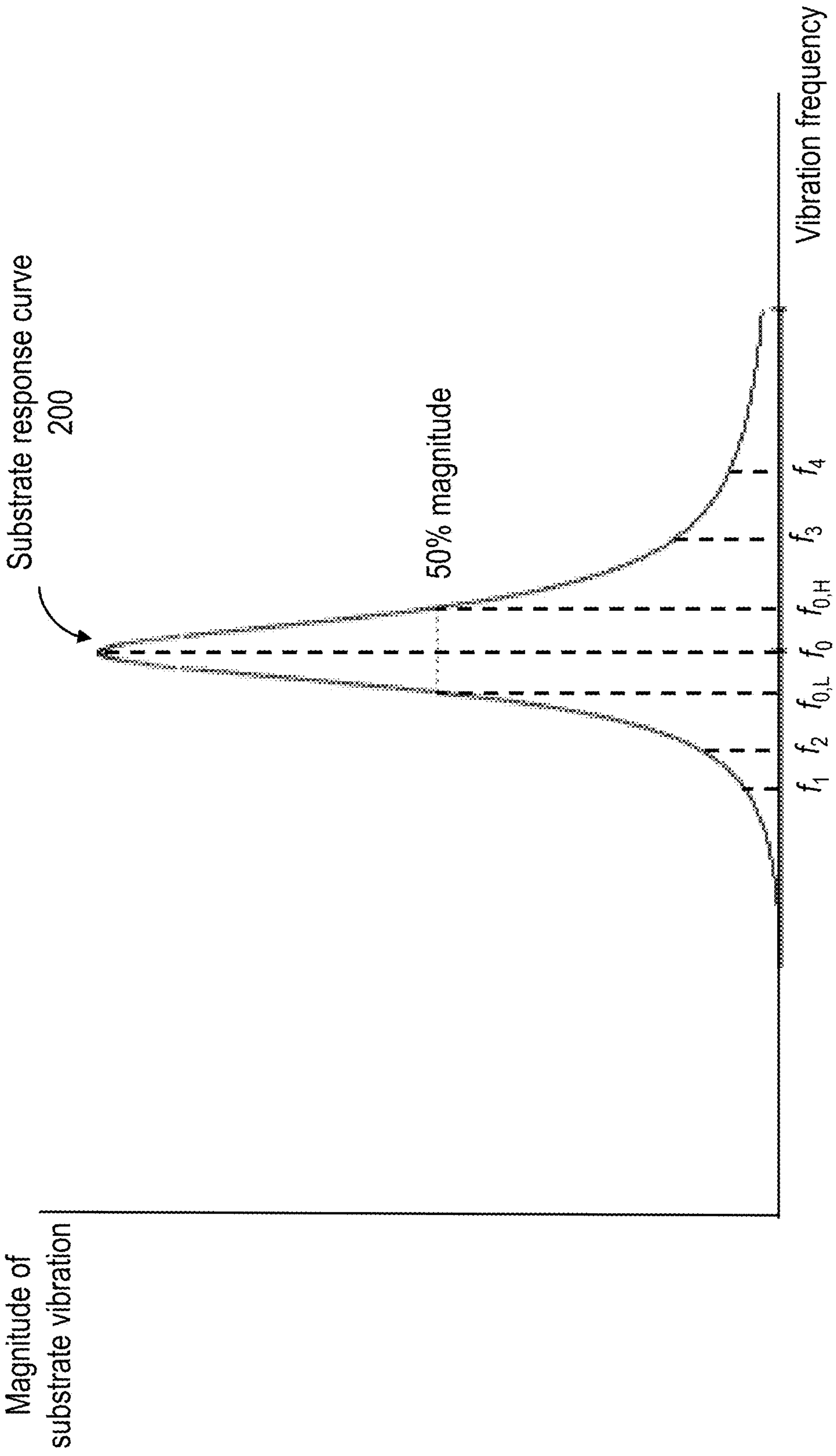
FIG. 2 is a diagram illustrating an example of resonance.

FIG. 2 illustrates an example of a substrate response curve 200 representing the magnitude of substrate 120 vibration as a function of vibration frequency of the substrates 120. At a maximum resonance frequency $f_0$, vibration magnitude is maximized. A high magnitude of substrate response is also observed for a range of vibration frequencies around the maximum resonance frequency $f_0$. For example, depending on the particular characteristics of the substrates 120, electroless plating solution, and/or other aspects of the electroless plating system 100, a high magnitude of substrate response may be observed for frequencies within a range of the maximum resonance frequency $f_0$, e.g., in a range between a low resonance frequency $f_{0,L}$ and a high resonance frequency $f_{0,H}$. Frequencies between $f_{0,L}$ and $f_{0,H}$ can be collectively referred to as resonance frequencies, such that "a resonance frequency" refers to a range of frequencies. In some implementations, the resonance frequencies are within about 20 Hz of $f_0$, such that $f_{0,L}=f_0-20$ Hz and $f_{0,H}=f_0+20$ Hz. In some implementations, the range from $f_0$ is 10 Hz or 30 Hz. In some implementations, $f_{0,L}$ and $f_{0,H}$ are frequencies that define half-maximum points of the substrate response curve 200, at which the magnitude of substrate vibration is half of its value at the maximum resonance frequency $f_0$.

In some implementations, to cause the substrates 120 to vibrate at a resonance frequency, the drive signals 116 can be configured to have substantially the same frequency. For example, a 500 Hz drive signal 116 can cause resonant substrate vibration with a frequency of or substantially matching 500 Hz. In some implementations, due to the physical response of the electroless plating system 100, circuitry of the transducers 118, and/or the like, a frequency of the drive signals 116 differs substantially from the frequency of vibration of the substrates 120.

Various suitable methods can be used to identify a resonance frequency and generate the drive signals 116 that have the resonance frequency or otherwise cause the substrates 120 to vibrate at the resonance frequency. In some implementations, drive signal generation is performed using one or more sensors, e.g., sensors 112*a*, 112*b*, 112*c* as shown in FIG. 1. Sensor 112*a* is arranged outside the tank 124 and configured to optically measure the electroless plating solution and/or the substrates 120 by receiving light 130. For example, the sensor 112*a* can be a laser displacement sensor configured to measure movement of one or more of the substrates 120 by measuring their displacement. When the substrates 120 are being vibrated at resonance, their displacement/movement will be higher. Sensor 112*b* is arranged in the tank 124 and configured to measure movement of the electroless plating solution, e.g., by detecting waves of the electroless plating solution and/or by measuring pressures of the electroless plating solution. For example sensor 112*b* can be a pressure sensor, a wave sensor, a fluid motion detector, or the like. When the substrates 120 are being vibrated at resonance, the electroless plating solution's movement will be higher. For example, motion of the electroless plating solution may exhibit a discontinuity, as a function of vibration frequency, when the substrates 120 reach resonance. In some implementations, a sensor 112*c* is mechanically coupled to a substrate 120 and/or a substrate holder 122 and is configured to measure a degree of movement of the substrate 120, e.g., using an accelerometer that measures corresponding movements of the coupled sensor. The degree of movement is highest when the substrates 120 are vibrated at resonance. The foregoing and other sensor types are configured to directly or indirectly detect/measure vibration of the substrates 120.

One or more of these and/or other sensor types and/or positionings can be used to measure movement of the electroless plating solution and/or the substrates 120. Sensor output 114 (e.g., including data or signals indicative of the movement) can be provided to the controller 106, and the controller 106 can generate control signals 110 based on the sensor output 114. For example, the control signals 110 can control a frequency and/or magnitude of the drive signals 116, and the frequency and/or magnitude can be determined by the controller 106 based on the sensor output 114.

Figure 3:
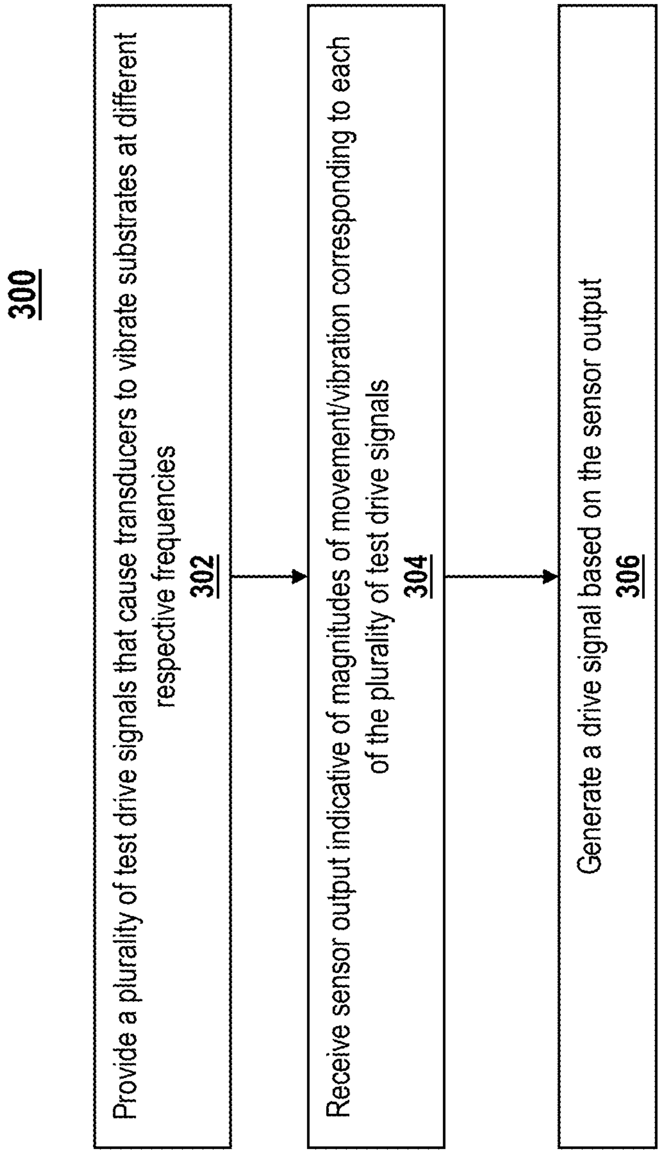
FIG. 3 is a diagram illustrating an example of a drive signal generation process.

FIG. 3 illustrates an example of a process 300 for tuning the drive signals 116. The process 300 can be performed, for example, by the driver 102. The controller 106 can provide control signals 110 that cause the signal generator 108 to generate drive signal(s) in accordance with the process 300.

The process 300 includes providing a plurality of test drive signals that cause transducers to vibrate substrates at different respective frequencies (302). For example, the controller 106 controls the signal generator 108 to send test drive signals to the transducers 118, where the test drive signals cause the transducers 118 to vibrate the substrates 120 at different respective frequencies. For example, referring to FIG. 2, first, second, third, and fourth test drive signals can cause the substrates 120 to vibrate at frequencies $f_1$, $f_2$, $f_3$, and $f_4$, respectively. The test drive signals can have different frequencies from one another. The test drive signals can cause the substrates 120 to vibrate at frequencies substantially matching the frequencies of the test drive signals. The test drive signals can cause the substrates 120 to vibrate at resonance and/or non-resonance frequencies.

The process 300 includes receiving sensor output indicative of magnitudes of movement and/or vibration corresponding to each of the plurality of test drive signals (304). For example, sensor output 114 can be received at the controller 106 from one or more sensors (e.g., sensors 112*a*, 112*b*, and/or 112*c*). The sensor output 114 can indicate magnitudes of movement and/or vibration of one or more of the substrates 120 and/or the electroless plating solution, as discussed above. The indicated magnitudes of movement and/or vibration can be absolute and/or relative.

The process 300 includes generating a drive signal based on the received sensor output (306). For example, a frequency of the drive signal (e.g., drive signal 116, to be used during electroless plating) can be based on the sensor output 114. In some implementations, a test drive signal that corresponds to the highest measured magnitude of movement/vibration is selected as the drive signal. The drive signal can have a frequency substantially matching a frequency of the test drive signal that caused the highest measured magnitude of movement/vibration.

In some implementations, elements of the process 300 are performed in sequence or iteratively as part of a resonance frequency identification process. For example, the drive signal frequency can be scanned across a range that is thought to include a resonance frequency (e.g., the maximum resonance frequency $f_0$), and the drive signal corresponding to each scanned frequency is a test drive signal. For example, starting from $f_1$, the drive signal frequency can be scanned to $f_4$, and movement can be measured for each drive signal frequency. The drive signal frequency corresponding to the highest measured movement, from among the frequencies of the test drive signals, can be identified as a resonance frequency and used for the drive signal 116. As another example, starting from $f_1$, the drive signal frequency can scan upward (corresponding to increasing magnitude of movement/vibration) until a decrease in the measured magnitude of movement/vibration is detected; the immediately-preceding tested frequency (e.g., $f_0$), corresponding to a maximum response, can be used for the drive signal 116 to cause the substrates 120 to vibrate at a resonance frequency. As another example, an optimization algorithm, such as the golden search method or a quasi-Newton method, can be used to iteratively test a variety of test drive signal frequencies until a test drive signal frequency providing a local maximum of measured movement/vibration is identified; this test drive signal frequency can be used as the frequency of the drive signal 116, to cause the substrates 120 to vibrate at a resonance frequency.

Control of the frequencies of the test drive signals, processing of the sensor output 114, selection of the frequency of the drive signal 116, frequency iteration/scanning, and/or other control and processing aspects of the process 300 can be performed by the controller 106 by providing corresponding control signals 110 to the signal generator 108. In some implementations, at least some aspects of the process 300 or other aspects of drive signal 116 generation are performed based on user input 128, which can be received by the controller 106. For example, a user can input a starting frequency for test drive signal scanning, can input a selected frequency of the drive signal, can input an amplitude of the drive signal 116, and/or the like.

In some implementations, in response to identification of a drive signal frequency corresponding to a resonance frequency, or in response to selection of a drive signal frequency for the drive signal 116, an amplitude of the drive signal 116 is increased, compared to amplitudes of the test drive signals. For example, iterative testing of test drive signals with different frequencies can be performed with low-amplitude signals for purposes of resonance frequency identification, and the generated drive signal 116 used during electroless plating can be a high-amplitude signal.

Figure 4:
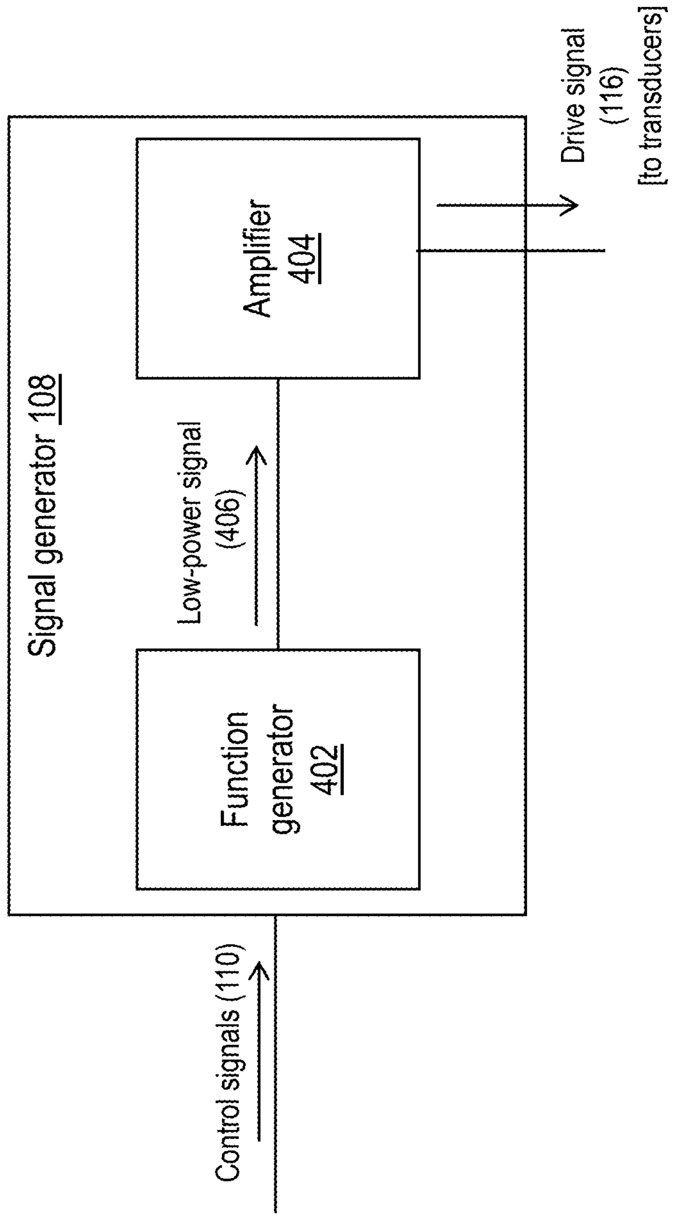
FIG. 4 is a diagram illustrating an example of a signal generator.

FIG. 4 illustrates an example of the signal generator 108. In some implementations, as shown in FIG. 4, the signal generator 108 includes a function generator 402 and an amplifier 404. The function generator 402 generates a low-power signal 406 that is then amplified, by the amplifier 404, as the drive signal 116 provided to transducers 118. The drive signal 116 can have a larger amplitude than the low-power signal 406. In some implementations, the low-power signal 406 and the drive signal 116 have the same waveform shape and/or the same frequency. For example, the drive signal 116 can be an amplified version of the low-power signal 406. The control signals 110 can cause the function generator 402 to output the low-power signal 406 with a specified frequency. For example, the control signals 110 can specify a frequency of a test drive signal during drive signal tuning as in process 300, and can specify a selected frequency for generation of the drive signal 116 for electroless plating. The control signals 110 can cause the amplifier 404 to output the drive signal 116 with a specified amplitude or degree of amplification, e.g., lower amplitude/less amplification during drive signal tuning as in process 300, and higher amplitude/more amplification for generation of the drive signal 116 for electroless plating.

The function generator 402 can include an analog and/or digital circuit configured to output signals, e.g., one or more types of periodic signals. For example, the function generator 402 can be or include a tone generator. The function generator 402 can be controllable to output signals with controllable/selectable frequencies. The amplifier 404 can include any suitable analog and/or digital amplification circuit.

The drive signal 116 can have any suitable waveform. The drive signal 116 can be periodic. In some implementations, the drive signal 116 is sinusoidal. In some implementations, the drive signal 116 has a non-sinusoidal periodic shape, such as square, triangle, or sawtooth.

The frequency of the drive signal 116 may depend on, among other possible factors, the material(s) and/or dimensions of the substrates 120 and the composition of the electroless plating solution, e.g., its density and viscosity. These and/or other factors can affect the resonance frequencies of the substrates 120, and the frequency of the drive signal 116 can correspondingly be different to cause vibration at a resonance frequency. In some implementations, the drive signal 116 has a frequency of at least 100 Hz. In some implementations, the drive signal 116 has a sub-ultrasonic frequency, e.g., less than 20 kHz or less than 10 kHz. In some implementations, the drive signal has a frequency in a range from 100 Hz, 200 Hz, or 300 Hz to 500 Hz, 600 Hz, or 1000 Hz. These frequencies have been found to be effective for achieving resonance for glass panels, which may have a natural resonance frequency of about 500 Hz that is lowered when the glass panels are immersed in a solution. The driver 102 (e.g., the function generator 402) can be configured or controlled to output signals having these frequencies. The foregoing frequencies and frequency ranges can also apply to vibration frequencies of the substrates 120, e.g., the drive signal 116 can be configured to cause the substrates 120 to vibrate at a frequency in a range from 200 Hz to 500 Hz.

Different types of substrate 120 may have different resonance frequencies and may correspondingly be vibrated at difference frequencies. For example, immersed glass substrates/panels may have a resonance frequency in a range from 100 Hz, 200 Hz, or 300 Hz to 500 Hz, 600 Hz, or 1000 Hz, e.g., about 350 Hz to 450 Hz. Silicon wafers may have a resonance frequency in a range from 20 kHz to 250 kHz.

Figure 5:
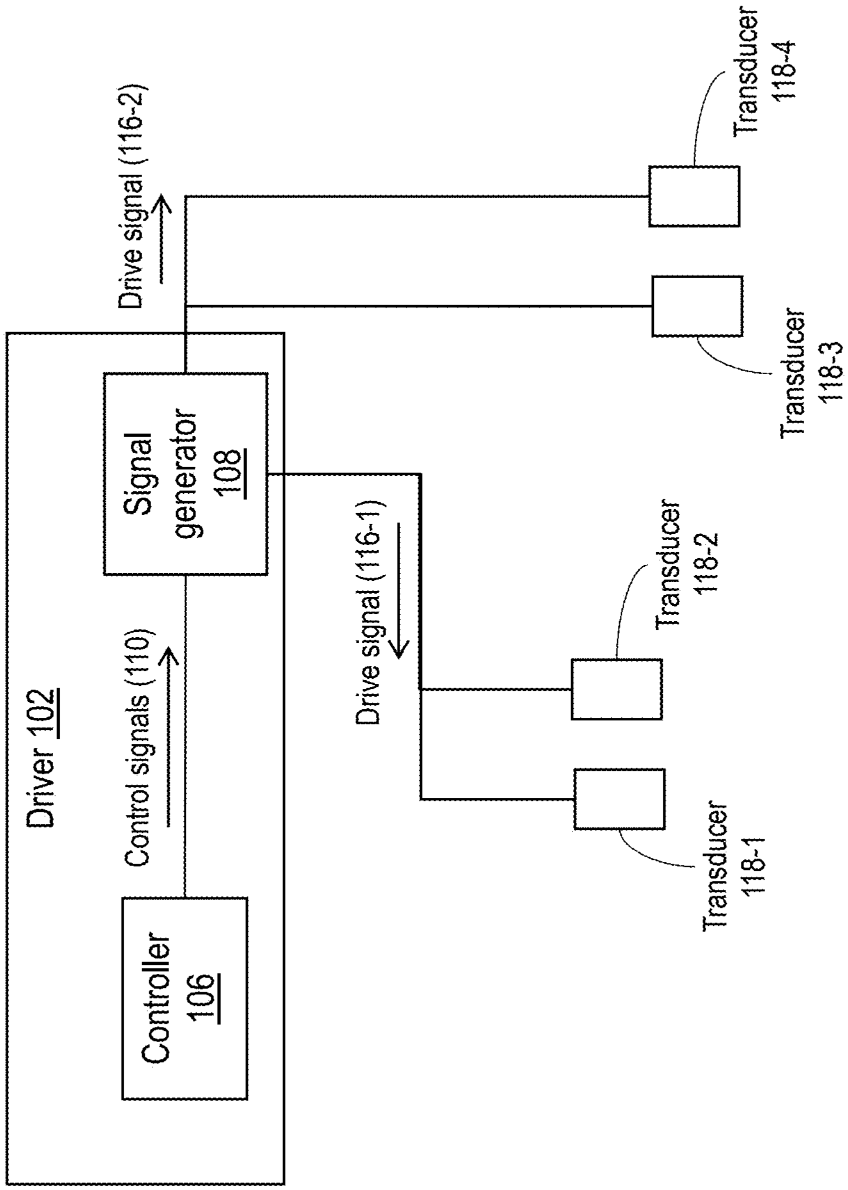
FIG. 5 is a diagram illustrating examples of drive signals.

In some implementations, when there are multiple transducers 118, a common drive signal 116 is provided to the transducers 118. In some implementations, different drive signals are provided to different transducers. For example, as shown in FIG. 5, a first drive signal 116-1 is provided to one or more first transducers 118-1, 118-2, and a second drive signal 116-2 is provided to one or more second transducers 118-3, 118-4. The first and second drive signals 116-1, 116-2 can differ in one or more of amplitude, frequency, phase, and shape. In some implementations, the first and second drive signals 116-1, 116-2 have a common frequency with a phase therebetween. The phase can be configured to account for different propagation times for vibration waves from the transducers 118-1, 118-2 to the substrates 120 compared to vibration waves from the transducers 118-3, 118-4 to the substrates 120, e.g., based on differing distances between the transducers 118 and the substrates 120. For example, the phase can be configured to reduce or eliminate phases between respective vibrations received at the substrates 120 from the transducers 118-1, 118-2 and the transducers 118-3, 118-4.

Figure 6:
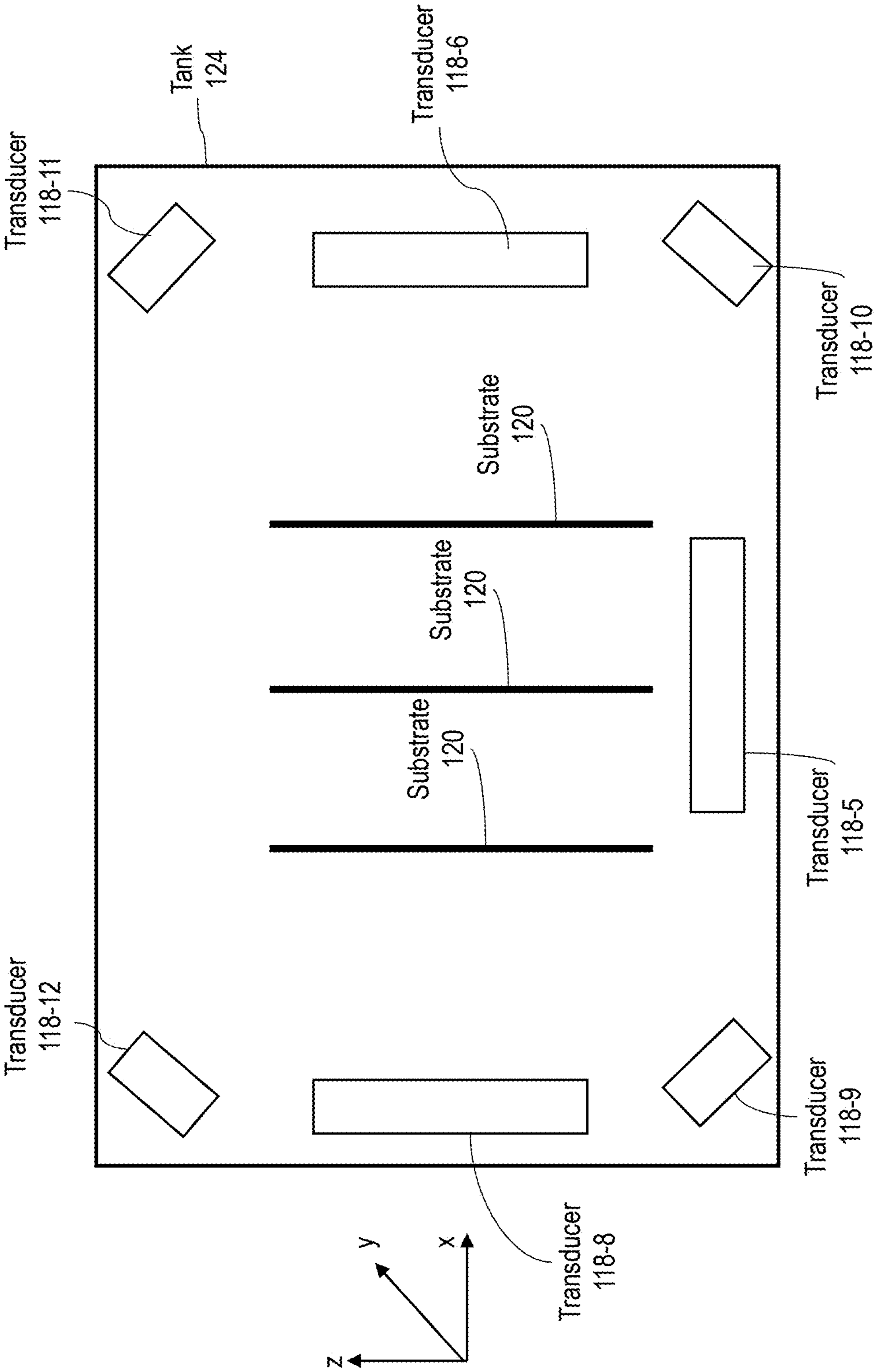
FIG. 6 is a diagram illustrating an example of an electroless plating system.

FIG. 6 illustrates another example of an arrangement of transducers 118 in a tank 124. The substrates 120 are oriented vertically and parallel to one another, extending in the y-z plane and spaced apart in the x-direction. Transducers 118-6 and 118-8 are mounted on left and right walls (e.g., inner or outer walls) of the tank 124 from the perspective of FIG. 6 (e.g., walls opposing one another along the x-direction). Transducers 118-6 and 118-8 can extend along the y-direction to cover most or all of an extent of the substrates 120 along the y-direction. Transducer 118-5 is mounted on a bottom inner wall of the tank 124 and can extend along the y-direction to cover most or all of an extent of the substrates 120 along the y-direction. Transducers 118-9, 118-10, 118-11, 118-12 are arranged at corners of the tank 124 to provide a "speaker effect" that may enhance vibration of the substrates 120. Although not shown in FIG. 6, transducers 118 can instead or additionally be mounted on front/back inner walls of the tank 124 from the perspective of FIG. 6 (e.g., walls opposing one another along the y-direction).

Figure 7:
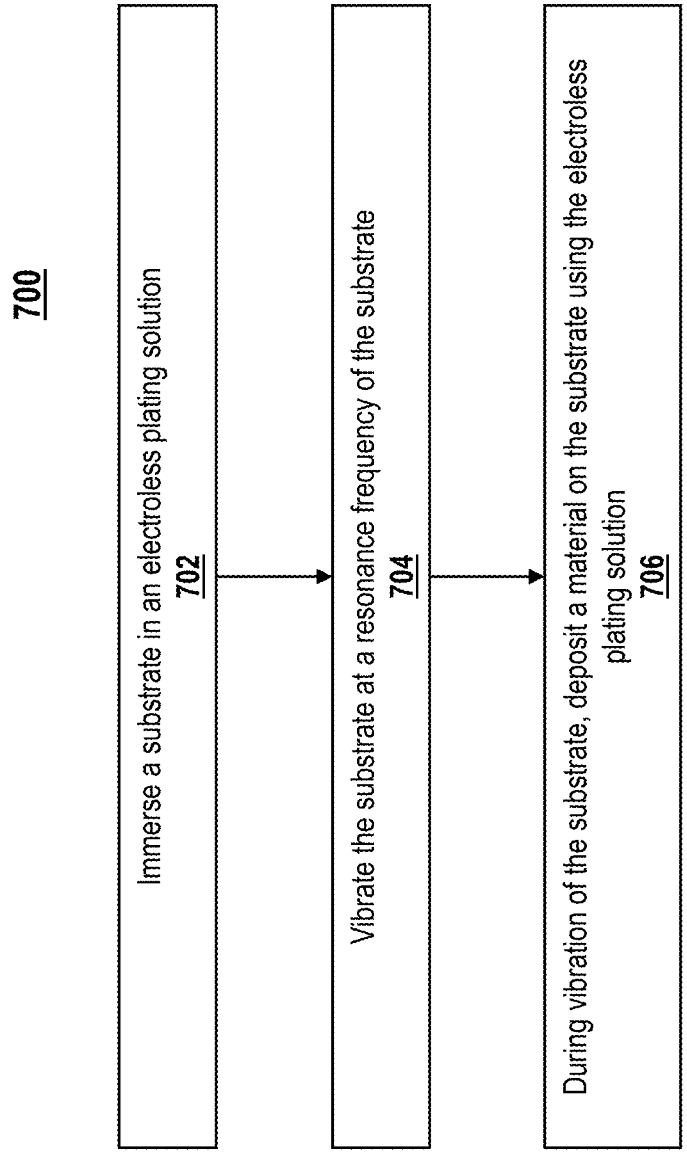
FIG. 7 is a diagram illustrating an example of an electroless plating process.

FIG. 7 illustrates an example of a process 700 for electroless plating. The process 700 can be performed using the electroless plating systems and apparatus described herein, and using the approaches and processes described with respect to FIGS. 1-6. For example, the process 700 can be performed using the electroless plating system 100. All description provided with respect to FIGS. 1-6 is equally applicable to the process 700.

As shown in FIG. 7, the process 700 includes immersing a substrate in an electroless plating solution (702). For example, the substrate can be a glass panel, and the electroless plating solution can be any suitable solution for electroless deposition of a metal or metal alloy on the substrate. For example, the electroless plating solution can include at least a metal salt and a reducing agent.

The process 700 includes vibrating the substrate at a resonance frequency of the substrate (704). For example, one or more transducers can be vibrated, and vibrations of the transducers can be transmitted to the substrate to cause vibration at the resonance frequency.

The process 700 includes, during vibration of the substrate, depositing a material on the substrate using the electroless plating solution (706). For example, the electroless plating solution can autocatalytically deposit a metal or metal alloy on the substrate. In some implementations, operation 706 includes heating the electroless plating solution and/or the substrate to an elevated temperature (e.g., a temperature of at least 50° C.). The material can include, for example, nickel, copper, palladium, gold, or an alloy thereof. In some implementations, the deposited material forms a conducting via through the substrate. In some implementations, the deposited material forms a trace or conducting plane on the substrate.

Electroless plating during vibration at the resonance frequency can be performed for any suitable length of time, e.g., based on the deposition rate and the target layer thickness. For example, in some implementations, the electroless plating is performed for a duration in a range from ten minutes to sixty minutes. After electroless plating has finished, the substrate can be removed from its tank and moved to another tank for rinsing. The rinsed substrate can then be dried, and further processing can be performed. For example, in some implementations, the substrate is annealed after drying. In some implementations, electroplating is performed to deposit additional conductive material on the electroless-deposited layer.

Figure 8:
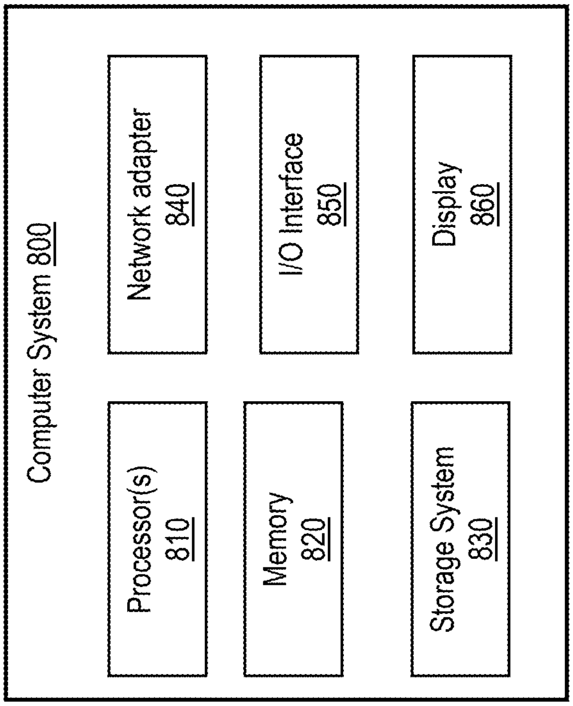
FIG. 8 is a diagram illustrating an example of a computer system.

FIG. 8 is a block diagram illustrating a computer system 800. In some implementations, the controller 106 is similar to, or is associated with, a computer system such as the computer system 800. The computer system 800 can be configured to perform operations described herein as being performed by the controller 106.

The computer system 800 may refer to any system including a general purpose or special purpose computing system. For example, the computer system 800 may include a personal computer, a server computer, a cloud computing system, a laptop computer, a home appliance, and the like. As shown in FIG. 8, the computer system 800 may include at least one processor 810, a memory 820, a storage system 830, a network adapter 840, an input/output (I/O) interface 850, and a display 860.

The at least one processor 810 may execute a program module including computer system executable instructions. The program module may include routines, programs, objects, components, logic, data structures, and the like, performing a specific task or implementing a specific abstract data type. The memory 820 may include a computer system readable, non-transitory medium in the form of a volatile memory such as a random access memory (RAM). The at least one processor 810 may access the memory 620 and execute instructions loaded in the memory 820. The storage system 830 may non-volatilely store information and may include at least one program product including a program module configured to control of the driver 102 as described herein, e.g., processing of sensor output 114 and/or generation of control signals 110. A program may include, by way of non-limiting examples, an operating system, at least one application, other program modules, and program data.

The network adapter 840 may provide a connection to a local area network (LAN), a wide area network (WAN), and/or a public network (e.g., the Internet), etc. The I/O interface 850 may provide a communication channel with a peripheral device such as a keyboard, a pointing device, and an audio system. The display 860 may output various pieces of information so that the user may check the information.

In some implementations, the control, tuning, driving, and other processes disclosed above are implemented as or using a computer program product. The computer program product may include a non-transitory computer-readable medium (or storage medium) including computer-readable program instructions for causing the at least one processor 810 to perform driver control. Computer readable instructions may be, but are not limited to, assembler instructions, instruction set architecture (ISA) instructions, machine instructions, machine dependent instructions, microcode, firmware instructions, state setup data, or source code or object code written in at least one programming language.

The computer-readable medium may be any type of medium capable of non-transitorily holding and storing instructions executed by the at least one processor 810 or any instruction executable device. The computer-readable medium may be an electronic storage device, a magnetic storage device, an optical storage device, an electromagnetic storage device, a semiconductor storage device, or any combination thereof, but is not limited thereto. For example, the computer readable medium may be a portable computer diskette, a hard disk, a random access memory (RAM), a read-only memory (ROM), an electrically erasable read only memory (EEPROM), a flash memory, a static random access memory (SRAM), a compact disc (CD), a digital versatile disc (DVD), a memory stick, a floppy disk, a mechanically encoded device such as a punch card, or any combination thereof.

A number of implementations have been described. Nevertheless, it will be understood that various modifications may be made. While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

What is claimed is:

1. A method, comprising:

immersing a substrate in an electroless plating solution in a tank, wherein the substrate comprises a glass panel having a lateral dimension of at least 50 cm;

vibrating the substrate at a resonance frequency of the substrate, wherein the resonance frequency is in a range from 200 Hz to 500 Hz; and during vibration of the substrate, depositing a material on the substrate using the electroless plating solution.

2. The method of claim 1, wherein vibrating the substrate at the resonance frequency comprises vibrating one or more transducers that are arranged to transmit vibrations to the substrate.

3. The method of claim 2, wherein the one or more transducers comprise at least one of:

one or more transducers mounted to one or more walls of the tank, or one or more transducers immersed in the electroless plating solution.

4. The method of claim 2, wherein the one or more transducers are arranged such that vibration of the substrate is based primarily on vibrations transmitted from the electroless plating solution to the substrate.

5. The method of claim 2, wherein the one or more transducers comprises a plurality of transducers, and wherein the method comprises providing a plurality of drive signals to the plurality of transducers, respectively, the plurality of drive signals differing from one another in at least one of amplitude, frequency, phase, or shape.

6. The method of claim 5, wherein the plurality of drive signals have different phases configured to compensate for different propagation times for vibration waves from the plurality of transducers to the substrate.

7. The method of claim 2, wherein the one or more transducers comprises three transducers arranged to surround the substrate from three respective sides.

8. The method of claim 2, wherein a lateral dimension of a first transducer of the one or more transducers is at least 80% of the lateral dimension of the substrate.

9. The method of claim 2, wherein a lateral dimension of a first transducer of the one or more transducers is at least 50 cm.

10. The method of claim 1, wherein vibrating the substrate comprises transmitting vibrations to the substrate through the electroless plating solution.

11. The method of claim 1, comprising:

measuring a magnitude of vibrations of at least one of the substrate or the electroless plating solution; and determining the resonance frequency based on the measured magnitude of the vibrations.

12. The method of claim 11, wherein measuring the magnitude of the vibrations comprises at least one of:

measuring motion of the electroless plating solution, measuring a pressure of the electroless plating solution, or measuring motion of the substrate.

13. The method of claim 1, wherein the resonance frequency is in a range from 350 Hz to 450 Hz.

14. The method of claim 1, wherein the resonance frequency is within 30 Hz of a maximum resonance frequency of the immersed substrate.

15. The method of claim 1, wherein the substrate comprises a glass panel.

16. The method of claim 1, comprising:

vibrating the substrate at a plurality of different frequencies;

for each of the plurality of different frequencies, measuring a corresponding magnitude of vibration of at least one of the substrate or the electroless plating solution; and determining the resonance frequency based on the measured corresponding magnitudes of vibration.

17. The method of claim 1, wherein vibrating the substrate at the resonance frequency of the substrate comprises maintaining vibration of the substrate within 30 Hz of a maximum resonance frequency of the immersed substrate during the deposition of the material.

18. The method of claim 1, wherein vibrating the substrate at the resonance frequency comprises applying a drive signal to one or more transducers, and wherein the one or more transducers are each configured to operate with a power of at least 150 W at the resonance frequency.

19. The method of claim 18, wherein the drive signal is configured to cause bubble removal from the substrate based on the vibration of the substrate.

* * * * *